May 16, 1933.　　　J. B. ARMITAGE　　　1,909,564

MACHINE TOOL ORGANIZATION

Filed June 17, 1929

INVENTOR
Joseph B Armitage
BY Fred G Parsons
ATTORNEY

Patented May 16, 1933

1,909,564

UNITED STATES PATENT OFFICE

JOSEPH B. ARMITAGE, OF WAUWATOSA, WISCONSIN, ASSIGNOR TO KEARNEY & TRECKER CORPORATION, OF WEST ALLIS, WISCONSIN

MACHINE TOOL ORGANIZATION

Application filed June 17, 1929. Serial No. 371,679.

This invention relates to a machine tool organization and particularly to improved structure for housing and supporting a rotatable spindle and its drive mechanism.

The main purpose is to provide spindle driving mechanism substantially completely housed within the main structure of the machine, together with means for controlling the distribution through the structure of the heat generated in the driving mechanism, and particularly with relation to determining the amount of heat interchanged between different chambers in the structure housing different portions of the drive mechanism.

Another purpose is generally to improve and simplify the construction, arrangement and operation of a machine tool and to promote the safety of the operator and still other purposes will be apparent from the accompanying drawing, description and claims.

The invention consists in the construction and combination of parts as herein illustrated, described and claimed and in such modifications of the structure illustrated as may be equivalent to the claims.

In the drawing the same reference characters are used to denote the same parts in the different views, of which:

Figure 2:
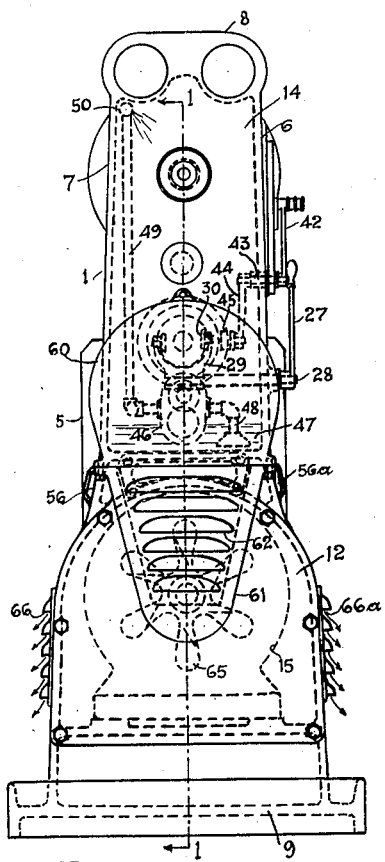
Fig. 2 is a rear elevation of the same machine.

A main support or column 1 rotatably supports a tool spindle 2 journaled in a front end wall 3 and a rear end wall 4, with its ends projecting outside these walls for various purposes.

A knee or work support 5 is vertically slidable on the front wall 3. Other relatively movable work supports such as saddle and table are ordinarily supported by the knee but the construction of such other supports being well known, they are not shown in the drawing.

Combined with the front and rear walls 3—4 are left and right side walls 6—7, a top wall 8, and a bottom wall 9 together providing a hollow box-like form for the column. A horizontal rib or wall 10 on which a motor is removably fixed and another rib or wall 11, taken in combination with the various other walls, provide a substantially closed lower or motor chamber at a lower level of the structure and generally denoted by the numeral 12. Above the wall 11 and spaced apart therefrom is a substantially horizontal rib or wall 13 which together with other wall portions provides a substantially closed upper or transmission chamber generally denoted by the numeral 14, in the upper portion of the column.

Figure 1:
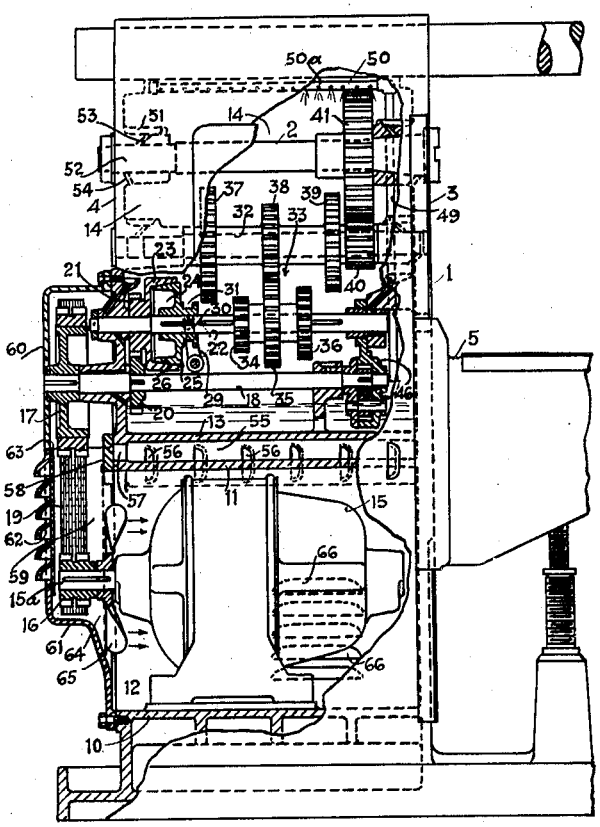
Fig. 1 is a left side elevation of a milling machine of knee and column type which includes the invention. A portion of the view is shown as a section taken along line 1—1 of Fig. 2, and some of the well known parts of a complete milling machine have been omitted.

The shaft 15a of motor 15 carries a sproket pinion 16 which drives a sprocket gear 17 fixed on a shaft 18 through a chain 19. Shaft 18 projects within the upper chamber 14 and drives spindle 2 through a transmission train, as follows:

A gear 20 fixed on shaft 18 engages a gear 21 rotatably supported on a shaft 22 with which is fixed the driving member 23 of a clutch generally denoted by the numeral 24, the driven member 25 of which is slidably keyed on the shaft 22, the members 23—25 having complementary friction cone surfaces 26. Member 25 may be shifted to engage and disengage the friction cone surfaces 26 by means of a hand lever 27 fixed on shaft 28 upon which is also fixed a fork member 29 having pivoted shoes 30 engaging an annular groove 31 in the hub of the member 25. Shaft 22 drives a shaft 32 through a rate changer generally denoted by the numeral 33, Fig. 1, and consisting of the different diametered gears 34—35—36 fixed together and slidably keyed on the shaft 22 and respectively adapted for engagement one at a time with the gears 37—38—39 fixed on shaft 32. A pinion 40 fixed on shaft 32 drives a gear 41 fixed on spindle 2. The gears 34—35—36 may be shifted by means of a hand lever 42 fixed on a shaft 43 upon which is also fixed a lever 44 having a pivoted fork 45 which engages the sides of the gear 35.

A lubricant system is provided for the spindle transmission as follows: A pump 46 of any suitable type is driven from the shaft 18 whereby it is operative irrespective of the position of clutch 24 and whenever any of the drive mechanism of the machine is in motion. The lower portion of the chamber 14 provides a reservoir generally denoted by the numeral 47 within which a body of lubricant is confined into which a suction or inlet pipe or channel 48 leading to pump 46 is submerged. An outlet pipe or channel 49 leading from pump 46 connects a pipe or header 50 to be supplied by lubricant from the pump. Header 50 is provided with a series of openings or delivery channels 50a out of which the fluid thus supplied is sprayed over the gearing within the chamber 14 and over the walls of the chamber. Lubricant thus delivered to the gearing will be thrown off when the gearing is in motion and such lubricant, together with the lubricant sprayed from header 50, will substantially fill the chamber 14 with a spray of fluid.

Each of the bearings for the various shafts is provided with an upwardly open cup or recess such as shown at 51 for the rear bearing 52 of the spindle 2. Such recesses are adapted to receive lubricant either from the spray filling the chamber 14 or from the lubricant which runs down the walls of the chamber, and to deliver such lubricant to the bearings with which they are associated by means of suitable channels such as 53. Such lubricant after passing through the bearing is returned again to the interior of chamber 14 by means of channels such as channel 54, whereby to again return to the reservoir 47.

The lubricating system just described tends to maintain a very uniform temperature within chamber 14 and throughout the gearing, bearings and walls associated therewith, in spite of the fact that the heat is generated in greatly different degree at different points in the chamber.

A considerable amount of heat is generated by motor 15 during operation of the machine. Unless prevented this might overheat the motor and the column walls forming chamber 12. Under some conditions of operation the temperature of the motor will tend to become much higher than that of the transmission within chamber 14. Under other conditions the reverse may be true. For these and various other reasons it has been found desirable to have somewhat of a control of the heat transferred or interchanged between the different chambers. It is particularly for this reason that the chambers 12 and 14 are spaced apart by the intermediate walls 11 and 13, such walls forming a channel or chamber 55 between the two chambers 12 and 14. The chamber 55 extends from the one to the other side wall of column 1 and is provided with louvres or openings through each side wall such as the openings 56—56a. There is also provided a rearward opening 57 which may be selectively closed or opened by means of a removable cover plate 58.

A substantially closed chamber 59 is formed adjacent the rear wall of the column by means of removable cover plates 60—61 which together with the rear wall of the column provide a housing for the sprockets and chain which drive shaft 18. Louvres or openings 62 in the cover plate 61 may communicate with the interior of the chamber 59 or may be closed to be inoperative by means of a plate 63 selectively removable or replaceable. The chamber 59 communicates with the motor chamber 12 through an opening 64 in the rear wall of the column and a fan 65 fixed on the motor shaft 15a continuously during operation of the motor 15 tends to displace air from the one to the other of chambers 59 and 12, preferably from the chamber 59 into the chamber 12 from which the air is expelled through louvres or openings 66—66a through side walls of the column and motor chamber. The arrangement is such that continuous circulation of air may be maintained through the motor chamber for the cooling of the motor and of the walls of the motor chamber and the path and effect of such circulation may be varied considerably.

In the event that the plate 58 is removed and the plate 63 is in place, all of the air displaced by the fan 65 will be drawn in through the louvres 56—56a and dispelled through the louvres 66—66a. In such case the maximum cooling effect will be exerted on the upper chamber rather than the motor, since the coldest air is drawn over the lower wall of such chamber, through which the fluid in the reservoir is radiating its heat. The motor, on the contrary, receives air already increased in temperature.

In the event that the plate 58 is in place and the plate 63 is removed, all of the air displaced by fan 65 will be drawn in through louvres 62 and expelled through louvres 66. In such event there will still be a circulation of air within the chamber 55 brought about by the heated air passing out of the chamber through the upper portions of the louvre openings and cooler air passing into the chamber through the lower portion of the louvre openings, and the upper chamber will be somewhat cooled, but the greatest cooling effect will in this case be on the motor, against which a large volume of cool air is directed.

In either case mentioned above the intermediate chamber 55 substantially prevents a direct interchange of heat from either the upper or lower chamber to the other.

What is claimed is:

1. In a milling machine, the combination of a column structure having upstanding side and end walls cooperating to form a plurality of juxtaposed chambers one above the other, a tool spindle journaled in said column, a speed change transmission enclosed within one of said chambers and connected to drive said spindle, a motor enclosed within the other chamber and connected to drive said speed change transmission, and individual heat distributing means for each chamber, said column structure having other walls defining a chamber interposed between said juxtaposed chambers in the natural path of heat exchange therebetween and adapted to substantially prevent a direct interchange of heat between said juxtaposed chambers.

2. In a milling machine, the combination of a column structure having upstanding side and end walls cooperating to form a first and second chamber juxtaposed one above the other, a tool spindle supported from some of said walls, a speed change transmission enclosed within said first chamber and connected to drive said spindle, a motor enclosed within said second chamber and connected to drive said speed change transmission, a fluid circulating system including a reservoir and means for the circulation of fluid from said reservoir through said first chamber and back to said reservoir, said circulating system providing means tending to distribute and equalize heat generated by said speed change transmission within said first chamber, and another fluid circulating system for the cooling of said second chamber and motor, said column structure having other walls defining a chamber interposed between said juxtaposed chambers and adapted to substantially prevent a direct interchange of heat therebetween, and means providing a circulation of fluid in said interposed chamber.

In witness whereof I have hereto affixed my signature.

JOSEPH B. ARMITAGE.